(12) United States Patent
Harada et al.

(10) Patent No.: US 7,624,699 B2
(45) Date of Patent: Dec. 1, 2009

(54) POINTER ILLUMINATOR

(75) Inventors: Takeshi Harada, Susono (JP);
Yoshiyuki Furuya, Susono (JP)

(73) Assignee: Yazaki Corporation, Tokyo (JP)

( * ) Notice: Subject to any disclaimer, the term of this patent is extended or adjusted under 35 U.S.C. 154(b) by 23 days.

(21) Appl. No.: 12/007,857

(22) Filed: Jan. 16, 2008

(65) Prior Publication Data

US 2008/0168939 A1     Jul. 17, 2008

(30) Foreign Application Priority Data

Jan. 17, 2007    (JP)   ............... 2007-008479
Jun. 11, 2007    (JP)   ............... 2007-153746

(51) Int. Cl.
    *G01D 13/22*     (2006.01)
    *G01D 11/28*     (2006.01)

(52) U.S. Cl. ............... 116/286; 116/288; 116/332; 116/DIG. 6; 362/26; 362/29

(58) Field of Classification Search ............ 116/284, 116/286–288, 327, 328, 332, 62.1, 62.4, 116/DIG. 5, DIG. 6, DIG. 36; 362/23, 28–30
See application file for complete search history.

(56) References Cited

U.S. PATENT DOCUMENTS

| | | | | |
|---|---|---|---|---|
| 5,878,689 | A * | 3/1999 | Sugita ............... | 116/286 |
| 6,626,549 | B2 * | 9/2003 | Fujita et al. ............ | 362/27 |
| 6,955,438 | B2 * | 10/2005 | Ishii ............... | 362/29 |
| 7,270,434 | B2 * | 9/2007 | Obata et al. ............ | 362/23 |
| 2003/0079672 | A1 * | 5/2003 | Kalashnikov et al. ..... | 116/288 |

FOREIGN PATENT DOCUMENTS

| | | | | |
|---|---|---|---|---|
| EP | 692699 | A1 | * | 1/1996 |
| JP | 2002081967 | A | * | 3/2002 |
| JP | 2002243508 | A | * | 8/2002 |
| JP | 2003194592 | A | * | 7/2003 |
| JP | 2004-294344 | | | 10/2004 |
| JP | 2004301643 | A | * | 10/2004 |
| JP | 2005227050 | A | * | 8/2005 |
| JP | 2005331289 | A | * | 12/2005 |
| JP | 2006337177 | A | * | 12/2006 |

* cited by examiner

*Primary Examiner*—Amy Cohen Johnson
(74) *Attorney, Agent, or Firm*—Edwards Angell Palmer & Dodge LLP

(57) ABSTRACT

The pointer illuminator includes: an optically transparent pointer member having a reflecting surface for a pointer, which surface reflects, light incident on a predetermined surface of incidence and guides the light to a tip of the pointer; a light source arranged around a drive shaft of the pointer member; and an optically transparent light-guiding member, which guides light from the light source to the surface of incidence and includes a first light-guiding reflecting surface provided on a face of the light-guiding member, an angle which the face forms with a center axis of the light source becoming smaller as the face leaves the light source so that the first light-guiding reflecting surface reflects the light from the light source to convert the light into approximately parallel light rays, whereby the light-guiding member guides the parallel light rays to the surface of incidence.

15 Claims, 15 Drawing Sheets

REAR END ← → TIP

REAR END ← → TIP

POINTER ILLUMINATOR

BACKGROUND OF THE INVENTION (1) Field of the Invention

The present invention relates to a pointer illuminator, more particularly, to pointer illuminator including: an optically transparent pointer member having a reflecting surface for a pointer, which surface reflects light incident on a predetermined surface of incidence and guides the light to a tip (i.e. front end) of the pointer; a light source arranged around a drive shaft of the pointer member; and an optically transparent light-guiding member which guides light from the light source to the surface of incidence of the pointer member.

(2) Description of the Related Art

Currently, a pointer of a meter for a motor vehicle has an illuminating function to ensure good visibility when a meter having an illuminating function at night or a selfluminous meter is being used in the nighttime and in the daytime. As shown in FIG. 16, light L from a light source 2 (valve, LED) placed on a meter board 1 is introduced into a pointer 3 from a light-receiving surface 4 on the side of the pointer 3 and is finally guided out from the pointer 3 by using a diffusing/reflecting layer 5 by means of a hot stamping or fine prism, so that the illumination is performed.

Moreover, an area of the light-receiving surface 4 on the side of the pointer 3 is forced to be small because of a requirement in designing (i.e. the pointer 3 being thin and bright as much as possible) and a weight limitation of the pointer 3 (i.e. weight limitation of a subject being driven by a motor for rotating the pointer). Accordingly, as shown in FIG. 17, a plurality of the light sources 2 are placed to realize a bright pointer illumination without brightness nonuniformity throughout the whole area where the pointer 3 is rotated. However, as illustrated with a diagonal lines in FIG. 17, in fact, an area of the light-receiving surface 4 of the pointer 3 is small, therefore only a part of the light L coming out from a plurality of the light sources 2 enters the pointer 3. That means a great deal of light loss.

In order to solve the above problem, i.e. the great deal of light loss, as shown in FIG. 18, Japanese Patent Application Laid-Open No. 2004-294344 proposes a method, in which light L from a plurality of light sources 2 is collected in the proximity of a shaft by using a first reflecting surface 7 located within a light-introducing member 6, then thus collected light L is allowed to pass a second reflecting surface 8 which causes the collected light L to be reflected toward a third reflecting surface 9 and then finally, the reflected light L reflected by the third reflecting surface 9 is allowed to enter the pointer 3.

Further, when the light L coming out from the light source 2 has a certain angle of outgoing, the light enters each reflecting surface 7, 8, 9 with various angles. Each reflecting surface 7, 8, 9 of the light-introducing member 6 is constructed with a simple inclination or curved surface, therefore only the light L entering on a condition satisfying total reflection can be reflected. Since the light L coming out from the light source 2 with a certain angle of outgoing is narrowed to an angle satisfying the total reflection condition as much as possible, therefore in Japanese Patent Application Laid-Open No. 2004-294344, a light-guiding member 10 is placed between the light source 2 and the light-introducing member 6 so as to narrow the light L.

However, when the light-guiding member 10 is formed in a simple cylindrical shape as shown in FIG. 19, although it is possible to narrow the angle of outgoing of the light source 2, the degree of parallelization of the outgoing light L is low. As a result, a light loss tends to easily occur at the reflecting surfaces 7, 8, 9 where the light not satisfying the total reflection condition comes to the outside. That is, a part of the light L reflected at the first reflecting surface 7, which part is to be guided to the second reflecting surface 8, a part of the light L reflected at the second reflecting surface 8, which part is to be guided to the third reflecting surface 9, and a part of the light L reflected at the third reflecting surface 9, which part is to be guided to the tip of the pointer 3 are decreased, causing a problem that the pointer 3 cannot be illuminated with high brightness.

Further, when there are the light sources 2 each having a lens for narrowing the angle of outgoing and the angle of outgoing is very much narrowed, a range where one light source 2 can cover is decreased. Therefore, in such a case, many light sources 2 are required in order to cover the whole rotation range of the pointer 3, causing cost up. It may be also considered to decrease the light loss by subjecting each reflecting surface 7, 8, 9 to a mirror processing so as to decrease the light loss. However, it also causes cost up.

Further, according to the idea disclosed in Japanese Patent Application Laid-Open No. 2004-294344, the third reflecting surface 9 is placed on a drive shaft 11 of the pointer 3 and actual illuminated region of the pointer 3 can be formed only on a region facing the tip of the pointer 3 from the third reflecting surface 9 situated on the drive shaft 11, whereas the illuminated region of the pointer 3 is required to be wide as much as possible for the purpose of good visibility and good design. Even the drive shaft 11 is desirably in the illuminated region. However, such a purpose is hardly realized with the construction disclosed in Japanese Patent Application Laid-Open No. 2004-294344, that is, good visibility or good design cannot be realized therewith.

SUMMARY OF THE INVENTION

It is therefore an objective of the present invention to solve the above problems and to provide a pointer illuminator, by which the light loss at the reflecting surface of the pointer is reduced so as to illuminate the pointer with high brightness.

In order to attain the above objective, the present invention is to provide a pointer illuminator including:

an optically transparent pointer member having a reflecting surface for a pointer, which surface reflects light incident on (i.e. light entered on) a predetermined surface of incidence of the pointer member and guides the light to an tip (i.e. front end) of the pointer;

a light source arranged around a drive shaft of the pointer member; and an optically transparent light-guiding member, which guides light from the light source to the surface of incidence of the pointer member and includes a first light-guiding reflecting surface provided on a face of the light-guiding member, an angle which the face forms with a center axis of the light source becoming smaller as the face leaves the light source so that the first light-guiding reflecting surface reflects the light from the light source to convert the light into approximately parallel light rays, whereby the light-guiding member guides the parallel light rays to the surface of incidence of the pointer member.

With the construction described above, the approximately parallel light rays enter the reflecting surface for a pointer, so that almost all the light reflected at the reflecting surface for a pointer can be guided to the tip of the pointer. Therefore, the light loss at the reflecting surface for a pointer can be reduced and the pointer can be illuminated with high brightness.

A surface of incidence of the light-guiding member facing the light source is provided on a concave face of the light-guiding member, a part of the concave face existing on the center axis of the light source denting most in a direction leaving the light source.

With the construction described above, the light from the light source can be refracted at the surface of incidence of the light-guiding member toward the first light-guiding reflecting surface, so that more light can be converted into the approximately parallel light rays. Therefore, the light loss at the reflecting surface for a pointer can be further reduced and the pointer can be illuminated with high brightness.

The first light-guiding reflecting surface is provided on a paraboloid having the light source as a focal point.

With the construction described above, all of the light incident on the first light-guiding reflecting surface can be converted into the approximately parallel light rays along the center axis. Therefore, the light loss at the reflecting surface for a pointer can be further reduced and the pointer can be illuminated with high brightness.

In order to attain the above objective, the present invention is also to provide a pointer illuminator including:

an optically transparent pointer member having a reflecting surface for a pointer, which-surface reflects light incident on (i.e. light entered on) a predetermined surface of incidence of the pointer member and guides the light to a tip (i.e. front end) of the pointer;

a light source arranged around a drive shaft of the pointer member; and an optically transparent light-guiding member, which guides light from the light source to the surface of incidence of the pointer member and includes a first light-guiding reflecting surface provided on the side of the drive shaft and a second light-guiding reflecting surface provided on the side situated away from the drive shaft, whereby the light-guiding member guides light reflected by the first and second light-guiding reflecting surfaces to the surface of incidence of the pointer member, wherein the second light-guiding reflecting surface is provided on a first face of the light-guiding member, an angle which the first face forms with a center axis of the light source becoming larger as the first face leaves the light source so that the second light-guiding reflecting surface reflects and collects the light from the light source to the first light-guiding reflecting surface, wherein the first light-guiding reflecting surface is provided on a second face of the light-guiding member, an angle which the second face forms with the center axis of the light source becoming larger as the second face leaves the light source so that the first light-guiding reflecting surface reflects the light from the second light-guiding reflecting surface to convert the light into approximately parallel light rays.

With the construction described above, the approximately parallel light rays enter the reflecting surface for a pointer, so that almost all the light reflected at the reflecting surface for a pointer can be guided to the tip of the pointer. Therefore, the light loss at the reflecting surface for a pointer can be reduced and the pointer can be illuminated with high brightness. Further, since the amount of the light entered the light-guiding member is made as much as possible, therefore a surface of outgoing (i.e. surface from which the light goes out) can be made small with maintaining high efficiency even when the surface of incidence of the light-guiding member is made large. Accordingly, the light from the light source can be allowed to efficiently enter the pointer member, so that the pointer can be illuminated with high brightness.

The second light-guiding reflecting surface is provided at least on the center axis of the light source.

With the construction described above, the light on the center axis can be securely converted into the approximately parallel light rays, therefore the light from the light source can be allowed to further efficiently enter the pointer member.

The light source is arranged in such a manner that a center axis of the light source is parallel to the drive shaft of the pointer member, wherein the light-guiding member includes a third light-guiding reflecting surface, which reflects the parallel light rays parallel to the drive shaft converted by the first light-guiding reflecting surface toward the drive shaft so as to guide the parallel light rays to the surface of incidence of the pointer member.

With the construction described above, the surface of incidence of the pointer member can be made large in comparison with a case in which the approximately parallel light rays parallel to the drive shaft are allowed to directly enter the surface of incidence. Therefore, the light from the light source can be allowed to efficiently enter the pointer member, so that the pointer can be illuminated with high brightness.

The reflecting surface for a pointer of the pointer member includes: a first reflecting surface for a pointer provided at a rear end of the pointer at the front and reflecting incident light toward a tip of the pointer; and a second reflecting surface for a pointer provided at a dent where a bearing part of the drive shaft is projectingly formed and reflecting light entered from the surface of incidence of the pointer member to the first reflecting surface for a pointer.

With the construction described above, the light from the light source can be allowed to enter the first reflecting surface for a pointer not depending upon the rotational position of the pointer member. Therefore, the pointer can be illuminated with high brightness.

The first reflecting surface for a pointer is provided on the side of the further rear end of the pointer compared to the drive shaft, wherein a top of the dent is provided on the side of the further rear end of the pointer compared to the bearing part, said top being situated at the extremely front side.

With the construction described above, the light incident on the second reflecting surface for a pointer by the refracting surface can be easily reflected toward the first reflecting surface for a pointer located on the further rear side of the pointer compared to the drive shaft without parting the first reflecting surface for a pointer away from the second reflecting surface for a pointer so much. Therefore, in a limited space, the further rear side of the pointer compared to the drive shaft can also be made an illuminated region of the pointer.

The first reflecting surface for a pointer is provided on the side of the further rear end of the pointer compared to the drive shaft, wherein the pointer member includes a pointer body part having the first reflecting surface for a pointer and a light-introducing part having the surface of incidence of the pointer member and the second reflecting surface for a pointer, wherein the light-introducing part includes a refracting surface which refracts light reflected by the second reflecting surface for a pointer toward the first reflecting surface for a pointer.

With the construction described above, the light incident on the second reflecting surface for a pointer by the refracting surface can be reflected toward the first reflecting surface for a pointer located on the further rear side of the pointer compared to the drive shaft by the refracting surface without parting the first reflecting surface for a pointer away from the second reflecting surface for a pointer so much. Therefore, in a limited space, the further rear side of the pointer compared to the drive shaft can also be made an illuminated region of the pointer.

The pointer member includes a pointer body part and a light-introducing part having the surface of incidence of the pointer member, wherein the reflecting surface for a pointer of the pointer member includes: a first reflecting surface for a pointer, which is provided on the side of a further rear end of the pointer compared to the drive shaft of the pointer body part and reflects incident light toward a tip of the pointer; and a second reflecting surface for a pointer, which is provided in the light-introducing part and reflects incident light from the surface of incidence of the pointer member to the drive shaft, wherein the light-introducing part includes a refracting surface which refracts light reflected by the second reflecting surface for a pointer toward the first reflecting surface for a pointer.

With the construction described above, the light incident on the second reflecting surface for a pointer by the refracting surface can be reflected toward the first reflecting surface for a pointer located on the further rear side of the pointer compared to the drive shaft by the refracting surface without parting the first reflecting surface for a pointer away from the second reflecting surface for a pointer so much. Therefore, in a limited space, the further rear side of the pointer compared to the drive shaft can also be made an illuminated region of the pointer.

DESCRIPTION OF THE PREFERRED EMBODIMENTS

First Preferred Embodiment

Figure 1:
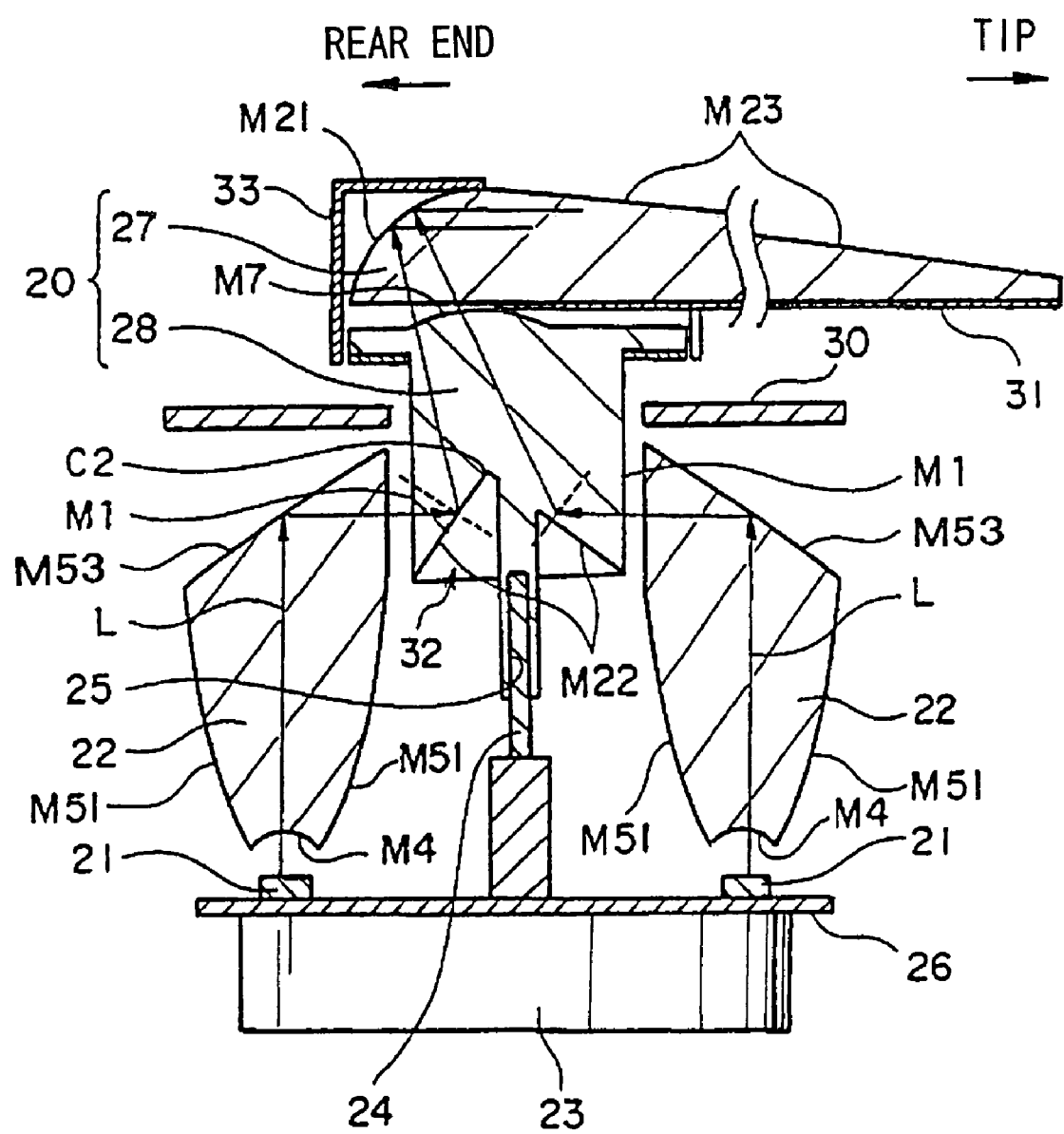
FIG. 1 is a cross sectional view illustrating the first preferred embodiment of a pointer illuminator according to the present invention.

In the following, a pointer illuminator according to the first preferred embodiment of the present invention will be explained with reference to the attached drawings.

As shown in the figures, the pointer illuminator includes a pointer member 20, light source 21, and light-guiding member 22. The pointer member 20 is made of optically transparent resin such as transparent poly methyl methacrylate (PMMA) and transparent poly carbonate (PC). The pointer member 20 is provided with a bearing part 25 to which a drive shaft 24 of a motor 23 is attached and rotates around the drive shaft 24. The motor 23 is provided on the rear side of a meter board 26. The drive shaft 24 of the motor 23 is provided projecting toward the front side of the meter board 26.

The pointer member 20 includes a first reflecting surface M21 for a pointer and a second reflecting surface M22 for a pointer, which reflect light L incident (i.e. entered) on a surface M1 of incidence so as to guide the light L to a tip (i.e. front end) of the pointer. The pointer member 20 includes: a pointer body part 27 having the first reflecting surface M21 for a pointer; and a light-introducing part 28 having the surface M1 of incidence and the second reflecting surface M22 for a pointer.

Figure 3:
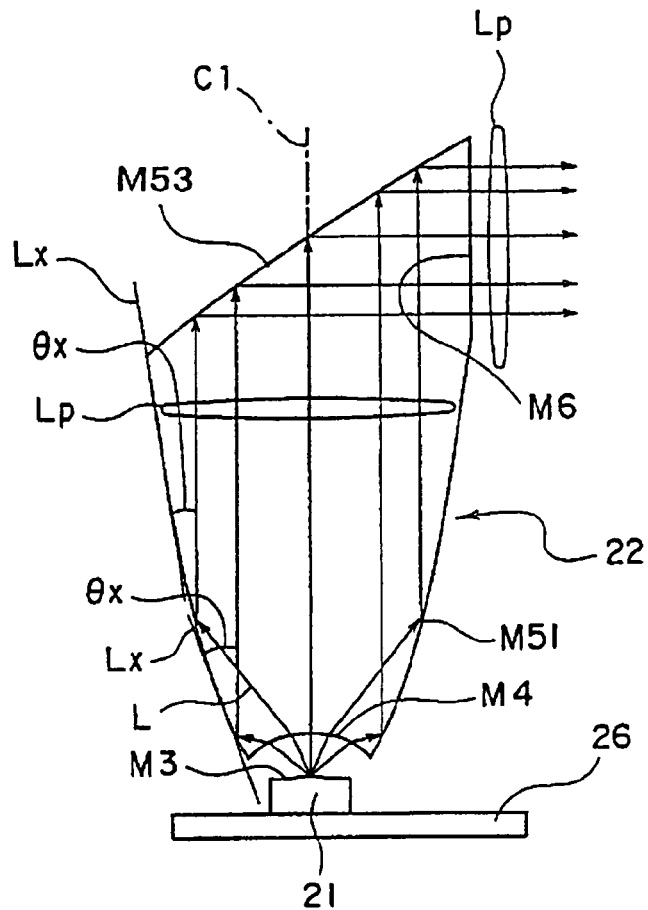
FIG. 3 is a cross sectional view taken along A-A line in FIG. 2B.

A plurality of the light sources 21 are arranged around the drive shaft 24 situated on the meter board 26. In the preferred embodiment, three light sources 21 are arranged on a circle around the drive shaft 24. The three light sources 21 are arranged spaced from each other with the same distance therebetween forming an angle of 120 degree therewith. As shown in FIG. 3, the light source 21 is arranged on the meter board 26 in such a manner that a center axis C1 of the light source 21 is parallel to the drive shaft 24. The light source 21 generates the light L radially around an intersection point between the center axis C1 and a surface M3 of outgoing.

Figure 2A:
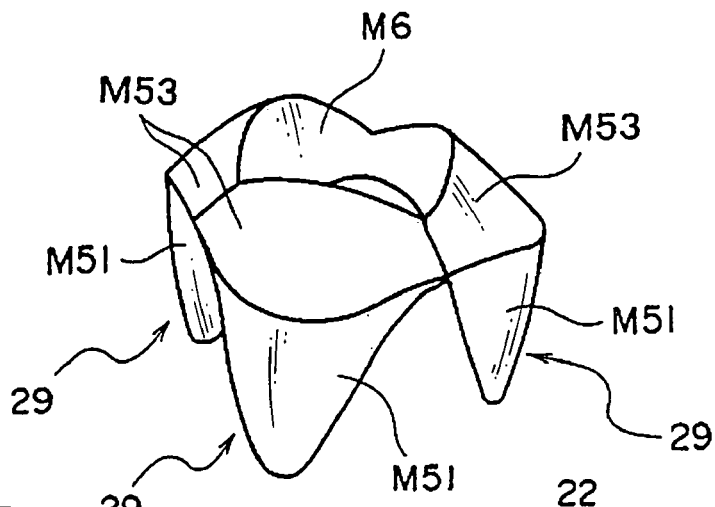
FIGS. 2A, 2B and 2C are a perspective view, front view and rear view, respectively, of a light-guiding member of the pointer illuminator shown in FIG. 1.
Figure 2B:
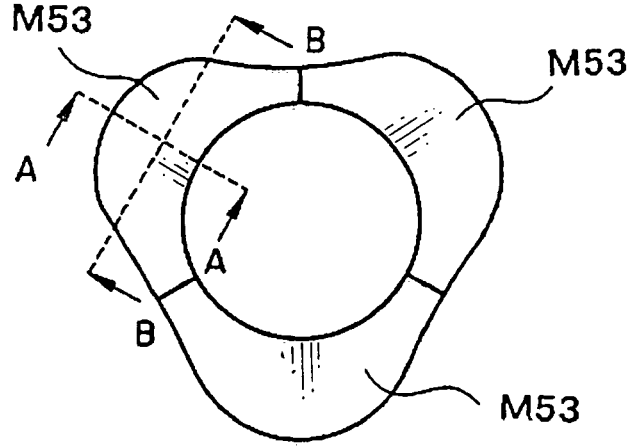

The light-guiding member 22 is made of optically transparent resin (for example, transparent PMMA or transparent PC). The light-guiding member 22 guides the light L from the light source 21 to the surface M1 of incidence of the pointer member 20. As shown in FIGS. 2 and 3, the light-guiding member 22 includes a surface M4 of incidence, a first light-guiding reflecting surface M51, a third light-guiding reflecting surface M53, and surface M6 of outgoing.

The surface M4 of incidence is provided at a top of a projection 29 (see FIG. 2) projecting toward the light source 21. Three projections 29, the same number as that of the light sources 21, are provided and have shapes communicating with each other at the side of the pointer member 20.

Figure 2C:
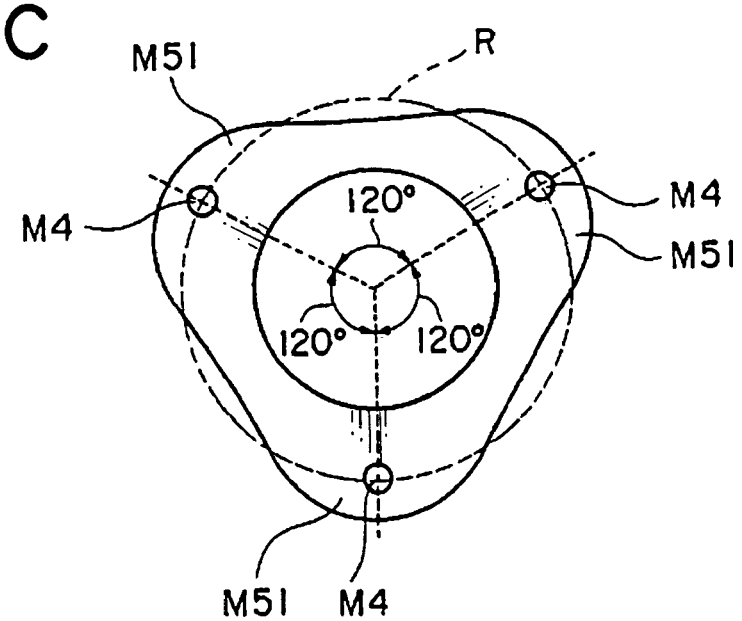

The surface M4 of incidence is provided on a concave face of the light-guiding member 22, a part of the concave face existing on the center axis of the light source 21 denting most in a direction leaving the light source 21. In detail, the surface M4 of incidence is provided on a spherical concave face around an intersection between the center axis C1 of the light source 21 and the surface M3 of outgoing. As shown in FIG. 2C, three surfaces M4 of incidence are provided on a circle R around the drive shaft 24. Similarly to the light sources 21, the surfaces M4 of incidence are provided spaced from each other with the same distance therebetween forming an angle of 120 degree therewith. As shown in FIG. 3, the first light-guiding reflecting surface M51 is provided on a face of the light-guiding member 22, an angle θx which the face forms with the center axis C1 of the light source 21 becoming smaller as the face leaves the light source 21 so that the first light-guiding reflecting surface M51 reflects the light L from the light source 21 to convert the light L into approximately parallel light rays Lp along the drive shaft 34. In detail, the first light-guiding reflecting surface M51 is provided in such a manner that the angle θx which a tangent line of the first light-guiding reflecting surface M51 forms with the center axis C1 of the light source 21 becoming smaller.

In the preferred embodiment, the first light-guiding reflecting surface M51 is provided on a paraboloid having an intersection between the surface M3 of outgoing of the light source 21 and the center axis C1 of the light source 21 as a focal point. The first light-guiding reflecting surface M51 is provided in a parabola shape around the center axis C1 of the light source 21 even when the first light-guiding reflecting surface M51 is cut by a B-B line in FIG. 2B. The third light-guiding reflecting surface M53 reflects the approximately parallel light rays Lp along the drive shaft 34 converted by the first light-guiding reflecting surface M51 so as to convert the approximately parallel light rays Lp into the approximately parallel light rays Lp which advance toward the drive shaft 24.

The third light-guiding reflecting surface M53 is a tapered curved surface which approaches the drive shaft 24 as leaving the light source 21. The approximately parallel light rays Lp reflected by the third light-guiding reflecting surface M53 passes the surface M6 of outgoing and enters the surface M1 of incidence of the pointer member 20. The light-guiding member 22 is arranged on the back face of a dial 30 and cannot be seen from the front.

Figure 6:
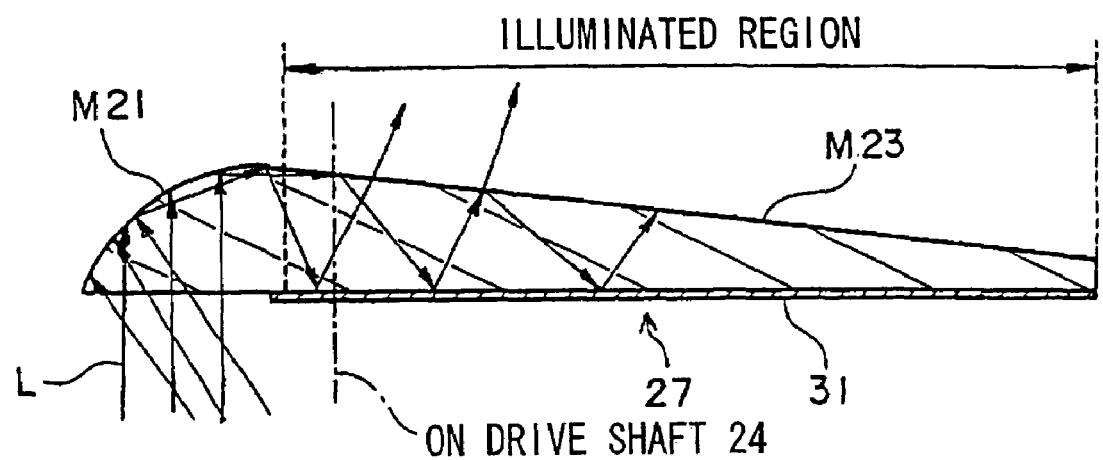
FIG. 6 is a partial cross sectional view of a pointer body part of the pointer illuminator shown in FIG. 1.

In the following, the pointer member 20 will be explained in detail. The pointer member 20 is provided projecting partially from an opening formed in the dial toward the front side. As shown in FIG. 6, the pointer body part 27 is provided with the first reflecting surface M21 for a pointer, the third reflecting surface M23 for a pointer, and a layer 31 of outgoing. The first reflecting surface M21 for a pointer is provided on the front side of the rear end of the pointer body part 27.

The first reflecting surface M21 for a pointer is provided on the side of the further rear end of the pointer compared to the drive shaft 24. The first reflecting surface M21 for a pointer is formed as a tapered curved surface, which approaches the front as approaching the tip of the pointer. Thereby, the first reflecting surface M21 for a pointer reflects the incident light L toward the tip of the pointer. The first reflecting surface M21 for a pointer is covered by a cap 33 (see FIG. 1) so as not to be seen from the front.

The third reflecting surface M23 for a pointer is provided at the front on the further tip-side of the pointer compared to the first reflecting surface M21 for a pointer. The third reflecting surface M23 for a pointer is formed as a tapered plane surface, which approaches the back face of the dial 30 as approaching the tip of the pointer. Thereby, the third reflecting surface M23 for a pointer reflects the light L reflected by the first reflecting surface M21 for a pointer toward the layer 31 of outgoing. The layer 31 of outgoing may include a white hot stamping layer having high reflectance or may be a layer subjected to a fine prism processing. The layer 31 of outgoing is a reflecting layer which reflects the light L from the third reflecting surface M23 for a pointer and allows the light L to go out toward the front.

Figure 4:
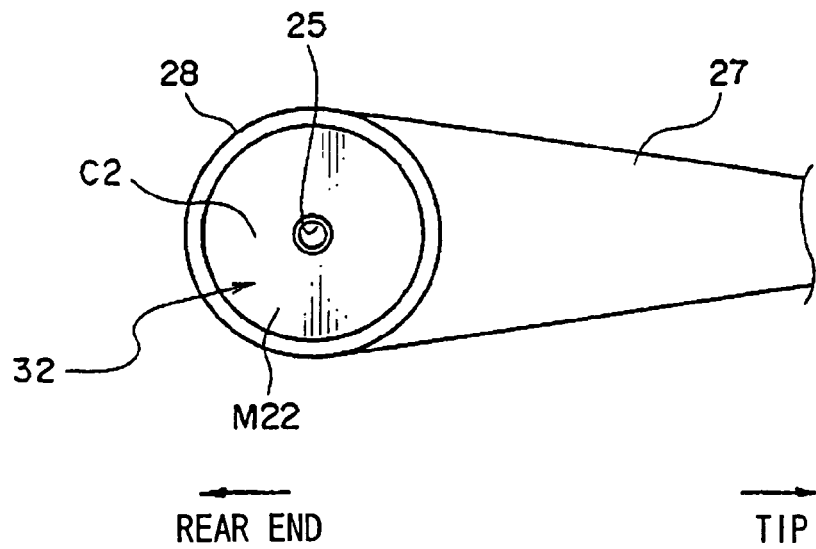
FIG. 4 is a rear view of a light-introducing part of the pointer illuminator shown in FIG. 1.
Figure 5A:
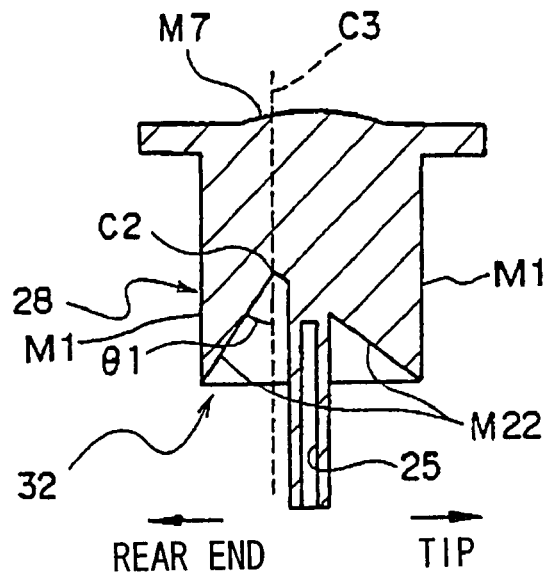
FIGS. 5A, 5B and 5C are cross sectional views illustrating examples of the light-introducing part of the pointer illuminator shown in FIG. 1.
Figure 5B:
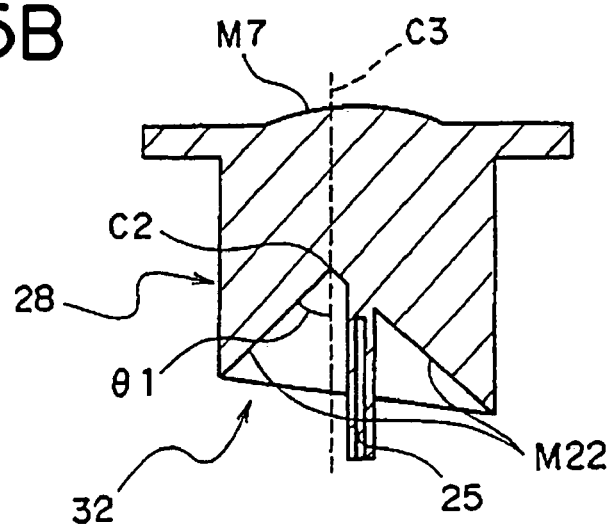
Figure 5C:
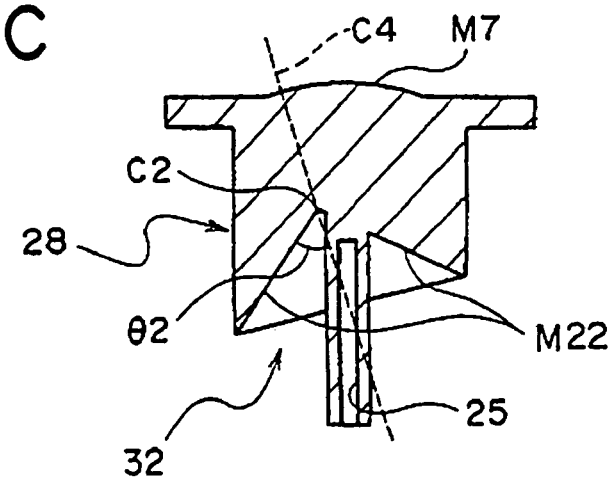

As shown in FIGS. 5A-5C, the light-introducing part 28 is provided with the surface M1 of incidence, the second reflecting surface M22 for a pointer, and a refracting surface M7. As shown in FIGS. 1 and 4, the second reflecting surface M22 for a pointer is provided on a dent 32 where the bearing part 25 is projectingly formed. The second reflecting surface M22 for a pointer reflects the light L incident on the surface M1 of incidence toward the side of the front. As shown in FIGS. 1, 4 and 5, a top C2 of the dent 32, situated extremely on the side of the front, is provided on the side of the further rear end of the pointer compared to the bearing part 25.

For example, the second reflecting surface M22 for a pointer may be provided as shown in FIG. 5A, in which the second reflecting surface M22 for a pointer is provided in such a manner that an angle θ1 which the second reflecting surface M22 for a pointer forms with an axis C3, the axis C3 being parallel to the drive shaft 24 and passing the top C2 situated on the side of the further rear end of the pointer compared to the drive shaft 24, changes as advancing from the rear end of the pointer toward the side of the tip of the pointer. In more detail, the second reflecting surface M22 for a pointer is provided so that the angle θ1 increases as advancing from the rear end to the tip (i.e. front end) of the pointer.

Alternatively, the second reflecting surface M22 for a pointer may be provided as shown in FIG. 5B, in which the second reflecting surface M22 for a pointer is provided in such a manner that the angle θ1 remains the same as advancing from the rear end to the tip (i.e. front end) of the pointer. Further alternatively, the second reflecting surface M22 for a pointer may be provided as shown in FIG. 5C, in which the second reflecting surface M22 for a pointer is provided in such a manner that the top C2 is positioned on a center axis C4 of the first reflecting surface M21 for a pointer and an angle θ2, which the second reflecting surface M22 for a pointer forms with the center axis C4, remains the same as advancing from the rear end to the tip (i.e. front end) of the pointer.

The refracting surface M7 is provided on the side of the pointer body part 27 of the light-introducing part 28. The refracting surface M7 refracts the light L reflected by the second reflecting surface M22 for a pointer toward the first reflecting surface M21 for a pointer.

In the following, a way how the light L going out from the light source 21 of the pointer illuminator constructed as described above advances. As shown in FIG. 3, the light source 21 radiates the light L radially around an intersection between the center axis C1 and the surface M3 of outgoing. The light L radiated radially enters the light-guiding member 22 from the surface M4 of incidence.

The light L incident on the light-guiding member 22 is refracted by the surface M4 of incidence toward the side situated away from the center axis C1, that is, toward the first light-guiding reflecting surface M51. Thereafter, the light L incident from the surface M4 of incidence is reflected by the first light-guiding reflecting surface M51 and converted into the approximately parallel light rays Lp along the drive shaft 24. In detail, the first light-guiding reflecting surface M51 reflects the light L, which advances not along the drive shaft 24, among the light L entered the light-guiding member 22, in a direction along the drive shaft 24. The approximately parallel light rays Lp along the drive shaft 24 are reflected by the third light-guiding reflecting surface M53 and converted into the approximately parallel light rays Lp which advance toward the drive shaft 24.

Thereafter, the approximately parallel light rays Lp advancing toward the drive shaft 24 go out from the surface M6 of outgoing of the light-guiding member 22 and enters the light-introducing part 28 from the surface M1 of incidence. As shown in FIG. 1, the light L incident (i.e. entered) from the surface M1 of incidence is reflected by the second reflecting surface M22 for a pointer toward the first reflecting surface M21 for a pointer situated on the side of the front. The light L reflected by the second reflecting surface M22 for a pointer is refracted by the refracting surface M7 toward the first reflecting surface M21 for a pointer and then, enters the first reflecting surface M21 for a pointer.

Thereafter, as shown in FIG. 6, the light L entered the first reflecting surface M21 for a pointer is reflected by the first reflecting surface M21 for a pointer toward the tip of the pointer. The light L reflected toward the tip of the pointer is reflected by the third reflecting surface M23 for a pointer toward the layer 31 of outgoing. Then, the light L reflected by the layer 31 of outgoing passes through the third reflecting surface M23 for a pointer and reaches an eye point of a driver of a vehicle, so that the illuminated pointer is seen.

According to the pointer illuminator having such a construction as described above, the approximately parallel light rays Lp, which are converted by the first light-guiding reflecting surface M51 of the light-guiding member 22, are guided to the surface M1 of incidence of the pointer member 20, therefore the approximately parallel light rays Lp enter the first reflecting surface M21 for a pointer and the second reflecting surface M22 for a pointer, so that almost all the light reflected by the first reflecting surface M21 for a pointer and the second reflecting surface M22 for a pointer can be guided to the tip of the pointer. Therefore, the light loss at the first reflecting surface M21 for a pointer and the second reflecting surface M22 for a pointer can be reduced and the pointer can be illuminated with high brightness.

According to the pointer illuminator having such a construction as described above, since the surface M4 of incidence of the light-guiding member 22 is provided on the concave face of the light-guiding member 22, a part of the concave face existing on the center axis C1 of the light source 21 denting most in a direction leaving the light source 21, therefore the light L from the light source 21 can be refracted at the surface M4 of incidence of the light-guiding member 22 toward the first light-guiding reflecting surface M51, so that more light L can be converted into the approximately parallel light rays Lp. Therefore, the light loss at the first reflecting surface M21 for a pointer and the second reflecting surface M22 for a pointer can be further reduced and the pointer can be illuminated with high brightness.

According to the pointer illuminator having such a construction as described above, since the first light-guiding reflecting surface 51 is provided on a paraboloid having the center axis C1 of the light source 21 as its axis, therefore all of the light L allowed to go out from the light source 21 by the first light-guiding reflecting surface M51 can be converted into the approximately parallel light rays Lp along the center axis C1. Therefore, the light loss at the first reflecting surface M21 for a pointer and the second reflecting surface M22 for a pointer can be further reduced and the pointer can be illuminated with high brightness.

According to the pointer illuminator having such a construction as described above, since the third light-guiding reflecting surface M53 reflects the approximately parallel light rays Lp parallel to the drive shaft 24 converted by the first light-guiding reflecting surface M51 toward the drive shaft 24 and guides the light rays Lp to the surface M1 of incidence, therefore the surface M1 of incidence of the pointer member 20 can be a surface being along the drive shaft 24 and therefore, the surface M1 of incidence can be made larger in comparison with a case in which the approximately parallel light rays Lp parallel to the drive shaft 24 is allowed to directly enter the surface M1 of incidence. As a result, the light L from the light source 21 can be allowed to efficiently enter the pointer member 20, so that the pointer can be illuminated with high brightness.

According to the pointer illuminator having such a construction as described above, since the light L entered from the surface M1 of incidence is reflected by the second reflecting surface M22 for a pointer, which is provided at the dent 32 having the bearing part 25, and guided to the first reflecting surface M21 for a pointer, therefore almost all of the light L from the light source 21 can be allowed to enter the first reflecting surface M21 for a pointer not depending upon the rotational position of the pointer member 20. Therefore, the pointer can be illuminated with high brightness.

According to the pointer illuminator having such a construction as described above, since the top C2 of the dent 32 situated extremely on the side of the front is provided on the side of the further rear end of the pointer compared to the bearing part 25, therefore the light L incident on the second reflecting surface M22 for a pointer can be easily reflected toward the first reflecting surface M21 for a pointer located on the further rear side of the pointer compared to the drive shaft 24 without parting the first reflecting surface M21 for a pointer away from the second reflecting surface M22 for a pointer so much. Therefore, in a limited space, as shown in FIG. 6, the further rear side of the pointer compared to the drive shaft 24 can also be made an illuminated region of the pointer.

According to the pointer illuminator having such a construction as described above, since the refracting surface M7 refracts the light L reflected by the second reflecting surface M22 for a pointer toward the first reflecting surface M21 for a pointer, therefore the light incident on the second reflecting surface M22 for a pointer by the refracting surface M7 can be reflected toward the first reflecting surface M21 for a pointer located on the further rear side of the pointer compared to the drive shaft 24 by the refracting surface M7 without parting the first reflecting surface M21 for a pointer away from the second reflecting surface M22 for a pointer so much. Therefore, in a limited space, as shown in FIG. 6, the further rear side of the pointer compared to the drive shaft 24 can also be made an illuminated region of the pointer.

In the preferred embodiment described above, the top C2 of the dent 32 situated extremely on the side of the front is provided on the side of the further rear end of the pointer compared to the drive shaft 24 so that the light L reflected by the second reflecting surface M22 for a pointer can enter the first reflecting surface M21 for a pointer provided on the side of the further rear end of the pointer compared to the drive shaft 24. However, instead, the second reflecting surface M22 for a pointer may have any suitable angle or suitable shape provided that the second reflecting surface M22 for a pointer reflects the light L from a second light-guiding reflecting surface M52 toward the front side.

Figure 7:
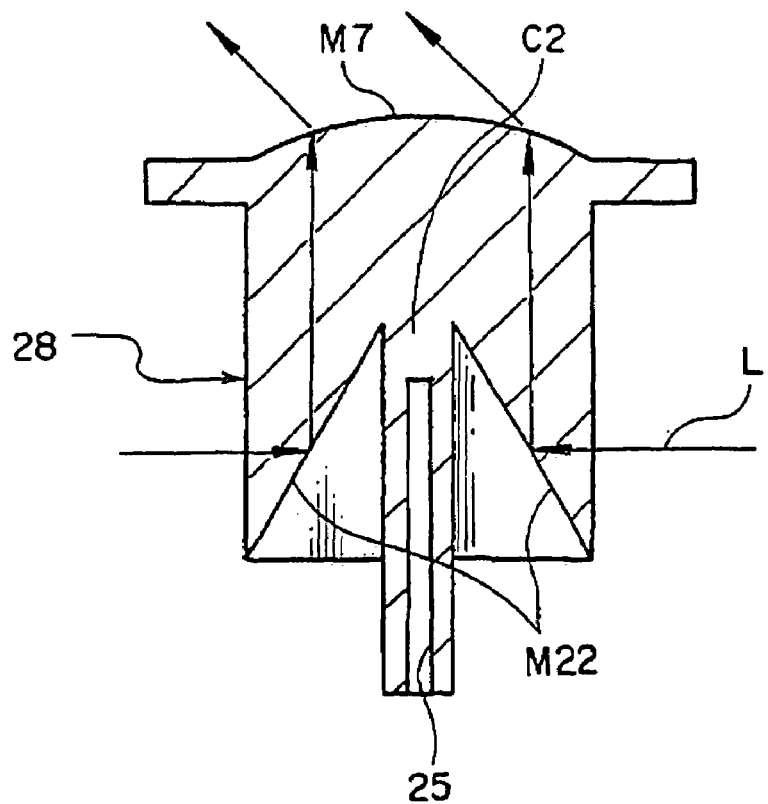
FIG. 7 is a cross sectional view of a light-introducing part according to another preferred embodiment of the present invention.

For example, as shown in FIG. 7, the second reflecting surface M22 for a pointer may be provided so that the second reflecting surface M22 for a pointer has a symmetric shape around the drive shaft 24, that is, the top C2 of the dent 32 situated on the extremely front side coincides with the bearing part 25. In this case, the second reflecting surface M22 for a pointer reflects the light L entered from the surface M1 of incidence toward the direction along the drive shaft 24. Then, the refracting surface M7 refracts the light L from the second reflecting surface M22 for a pointer so as to reflect the light L toward the first reflecting surface M21 for a pointer. In an example shown in FIG. 7, similarly to the above preferred embodiment, the refracting surface M7 can reflect the light L entered the second reflecting surface M22 for a pointer toward the first reflecting surface M21 for a pointer provided on the further rear side of the pointer compared to the drive shaft 24 without parting the first reflecting surface M21 for a pointer away from the second reflecting surface M22 for a pointer so much.

When the first reflecting surface M21 for a pointer and the second reflecting surface M22 for a pointer can be parted away from each other to some extent, the light L reflected by the second reflecting surface M22 for a pointer can be allowed to enter the first reflecting surface M21 for a pointer provided on the further rear side of the pointer compared to the drive shaft 24 even when the top C2 of the dent 32 situated on the extremely front side coincides with the bearing part 25.

In the preferred embodiment described above, the second reflecting surface M22 for a pointer, which reflects the light L going to the drive shaft 24 toward the front side, is provided on the pointer member 20, which rotates together with the drive shaft 24. However, the present invention is not limited to such an embodiment.

Figure 8:
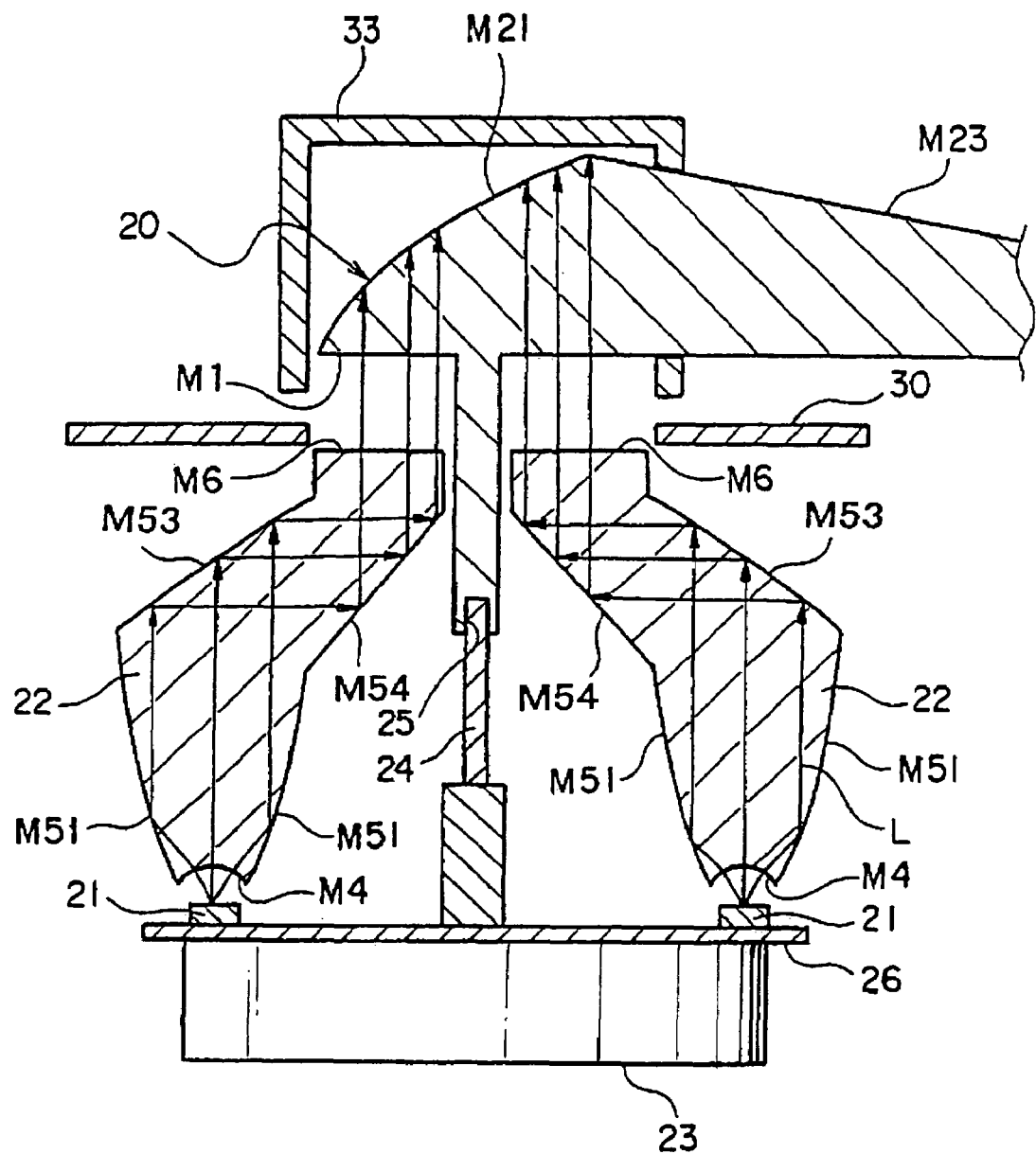
FIG. 8 is a cross sectional view illustrating a pointer illuminator according to another preferred embodiment of the present invention.

That is, for example, as shown in FIG. 8, instead of the second reflecting surface M22 for a pointer as described above, the light-guiding member 22 may be provided with a fourth light-guiding reflecting surface M54, which reflects the light L going to the drive shaft 24 toward the front side. As shown in FIG. 8, the pointer illuminator includes a pointer member 20, light source 21, and light-guiding member 22.

The light-guiding member 22 includes a surface M4 of incidence, a first light-guiding reflecting surface M51, third light-guiding reflecting surface M53, fourth light-guiding reflecting surface M54, and surface M6 of outgoing.

The fourth light-guiding reflecting surface M54 surrounds the drive shaft 24 and is a surface having a tapered shape approaching the drive shaft 24 as advancing to the front side. The fourth light-guiding reflecting surface M54 faces the third light-guiding reflecting surface M53. Thereby, the fourth light-guiding reflecting surface M54 is provided so as to reflects the light L from the third light-guiding reflecting surface M53 toward the front. The fourth light-guiding reflecting surface M54 reflects the light L in a direction along the drive shaft 24. The surface M6 of outgoing is provided at the front of the light-guiding member 22 so as to cross the drive shaft 24 at right angles.

The pointer member 20 is formed in one component. The pointer member 20 is provided with a surface M1 of incidence, first reflecting surface M21 for a pointer, third reflecting surface M23 for a pointer, and layer 31 of outgoing. The surface M1 of incidence crosses the drive shaft 24 at right angles. The first reflecting surface M21 for a pointer is provided on the further front side compared to the drive shaft 24.

In the following, a way how the light L going out from the light source 21 of the pointer illuminator having the construction described above will be explained. As shown in FIG. 8, the light L going out radially from the light source 21 enters the light-guiding member 22 from a surface M4 of incidence.

The light L entered the light-guiding member 22 is reflected by the first light-guiding reflecting surface M51 and converted into the approximately parallel light rays Lp along the drive shaft 24. The approximately parallel light rays Lp along the drive shaft 24 are reflected by the third light-guiding reflecting surface M53 and converted into the approximately parallel light rays Lp going toward the drive shaft 24. Thereafter, the approximately parallel light rays Lp going toward the drive shaft 24 is converted into the approximately parallel light rays Lp along the drive shaft 24 by the fourth light-guiding reflecting surface M54 and goes out from the surface M6 of outgoing. The light L going out from the surface M6 of outgoing goes to the first reflecting surface M21 for a pointer through the surface M1 of incidence.

Thereafter, the light L entered the first reflecting surface M21 for a pointer is reflected by the first reflecting surface M21 for a pointer toward the tip of the pointer (i.e. the front end of the pointer). The light L reflected toward the tip of the pointer is reflected by the third reflecting surface M23 for a pointer toward the layer 31 of outgoing. The light L reflected by the layer 31 of outgoing goes through the third reflecting surface M23 for a pointer and reaches an eye point of a driver, so that the illuminated pointer is seen by the driver.

According to the pointer illuminator as shown in FIG. 8, the light-guiding member 22 is provided with the fourth light-guiding reflecting surface M54, which reflects the light L from the third light-guiding reflecting surface M53 toward the front side, therefore the fourth light-guiding reflecting surface M54 does not rotate and therefore, a relative position between the light source 21 and the fourth light-guiding reflecting surface M54 can be fixed, so that nonuniformity of light can be prevented from occurring.

In the first preferred embodiment described above, the first light-guiding reflecting surface M51 is provided on a paraboloid having the intersection point between the surface M3 of outgoing of the light source 21 and the center axis C1 as a focal point. However, the present invention is not limited to such a preferred embodiment as described above. That is, the first light-guiding reflecting surface M51 may be such a curved surface that an angle θx which a tangent line Lx thereof forms with the center axis C1 of the light source 21 decreases as leaving the light source 21, so that the curved surface reflects the light L radially going out from the light source 21 and converts the light L into the approximately parallel light rays Lp along the drive shaft 24.

In the first preferred embodiment described above, the pointer member 20 is provided with the refracting surface M7. However, the present invention is not limited to such a preferred embodiment as described above. That is, for example, the pointer member 20 may not be provided with the refracting surface M7 besides the second reflecting surface M22 for a pointer. In this case, the pointer member 20 may integrally include the pointer body part 27 and the light-introducing part 28.

Figure 9:
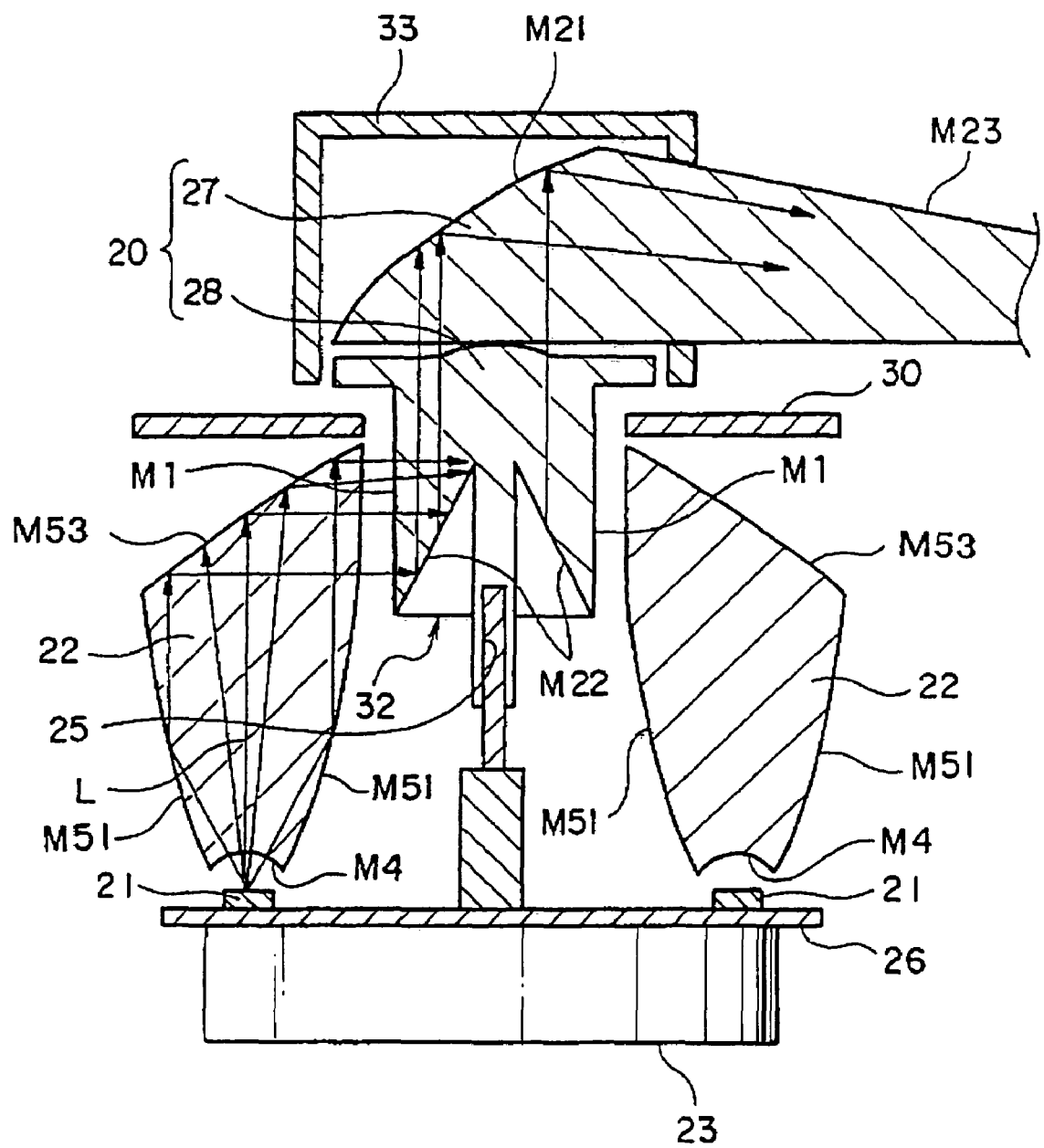
FIG. 9 is a cross sectional view illustrating a pointer illuminator according to a further preferred embodiment of the present invention.

In the first preferred embodiment described above, the second reflecting surface M22 for a pointer reflects the light L from the third light-guiding reflecting surface M53 with inclination to the rear end of the pointer, so that the first reflecting surface M21 for a pointer is provided on the further rear end of the pointer compared to the drive shaft 24. However, the present invention is not limited to such a preferred embodiment as described above. That is, for example, as shown in FIG. 9, the second reflecting surfaces M22 for a pointer may be formed symmetrically along the drive shaft 24 provided that the first reflecting surface M21 for a pointer is provided widely, that is, provided on the front side of the drive shaft 24 as well.

Figure 10A:
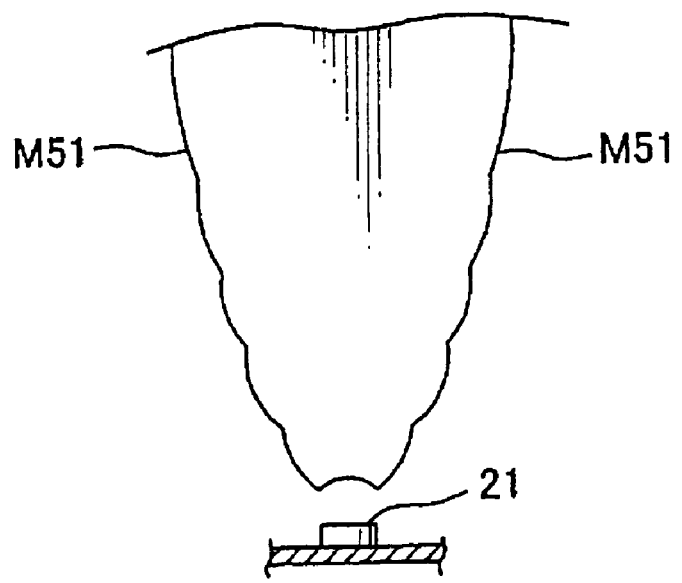
FIGS. 10A and 10B are views illustrating the first light-guiding reflecting surface according to another preferred embodiment of the present invention.
Figure 10B:
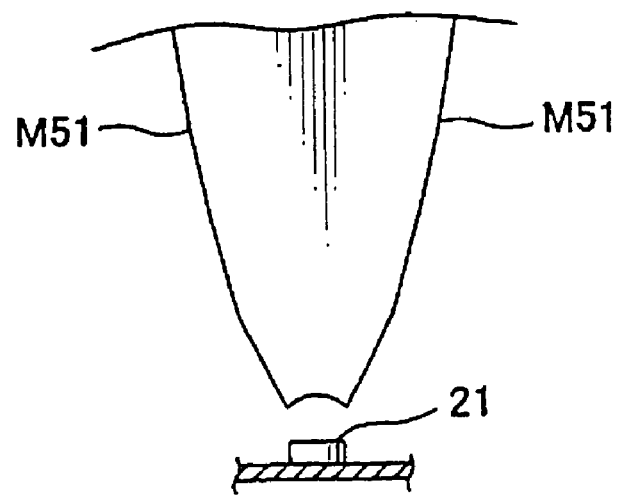

In the first preferred embodiment described above, the first light-guiding reflecting surface M51 is provided as a continuous curved surface. However, the present invention is not limited to such a preferred embodiment as described above. That is, for example, the first light-guiding reflecting surface M51 may be constructed with a plurality of curved surfaces as shown in FIG. 10A or, alternatively, with a plurality of flat surfaces as shown in FIG. 10B, so that the light reflected by the first light-guiding reflecting surface M51 is easily securely converted into the approximately parallel light rays Lp.

Second Preferred Embodiment

Figure 11:
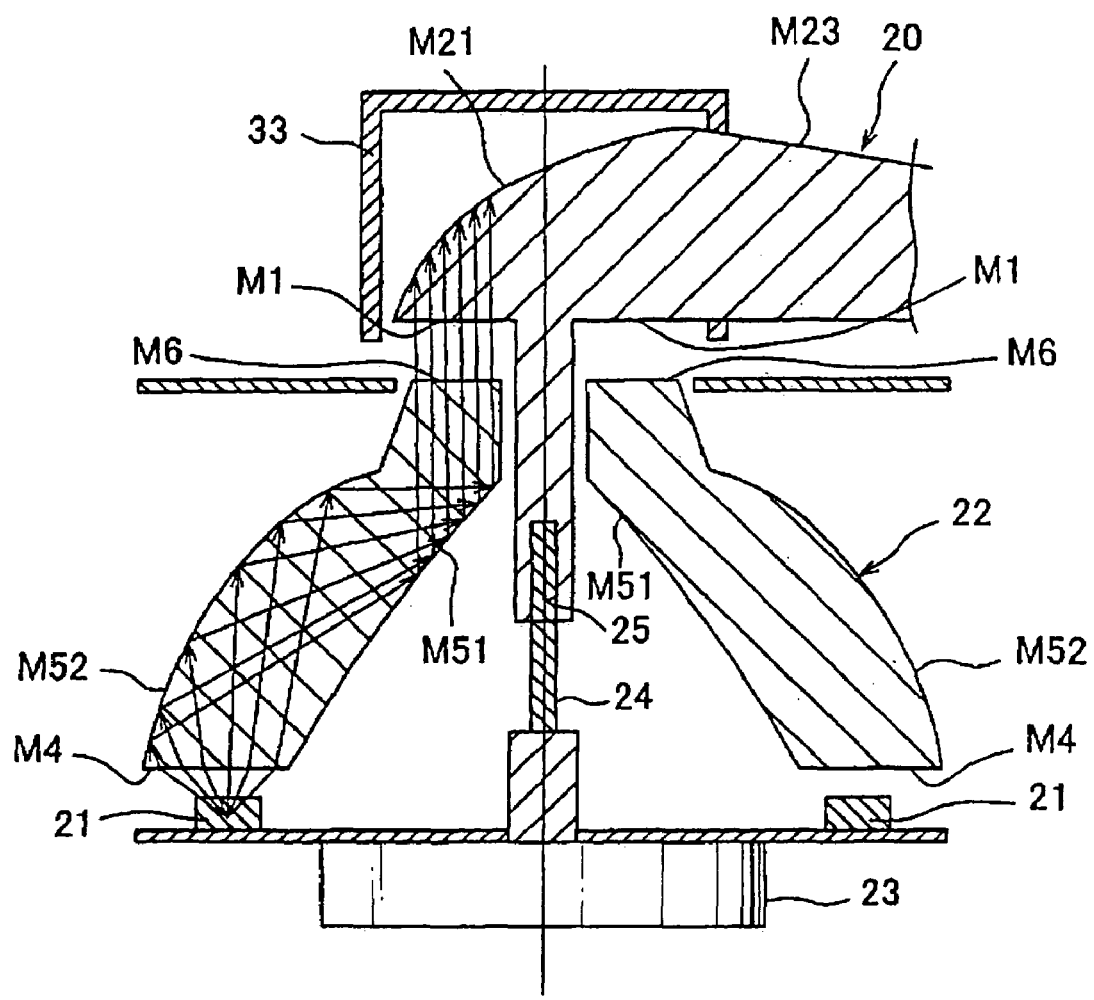
FIG. 11 is a cross sectional view illustrating the second preferred embodiment of a pointer illuminator according to the present invention.

In the following, a pointer illuminator according to the second preferred embodiment of the present invention will be explained with reference to the attached drawings. As shown in FIG. 11, the pointer illuminator includes a pointer member 20, light source 21, and light-guiding member 22.

Figure 12A:
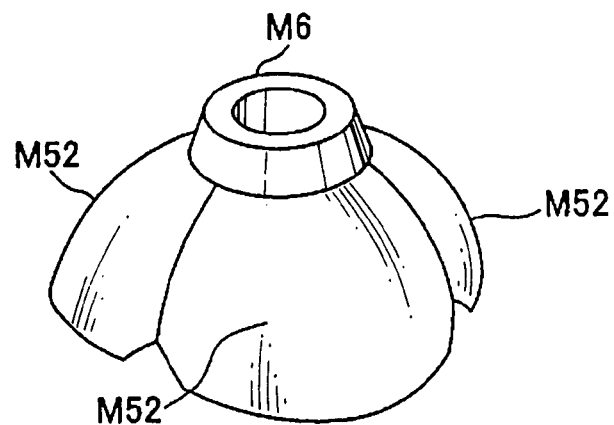
FIGS. 12A, 12B and 12C are a perspective view, front view and rear view, respectively, of a light-guiding member of the pointer illuminator shown in FIG. 11.
Figure 12B:
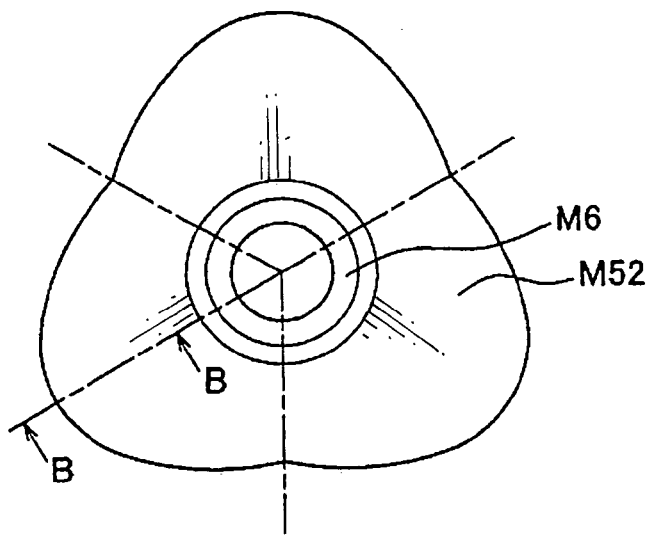
Figure 12C:
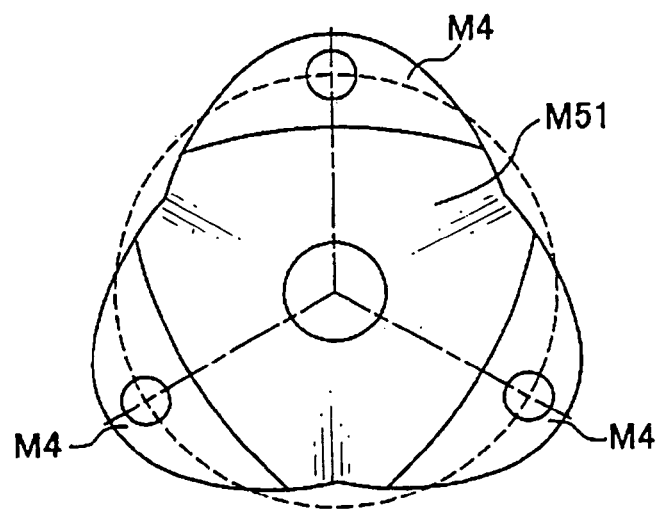

As shown in FIGS. 12A-12C, the light-guiding member 22 is formed approximately in a cylindrical shape in such a manner that a diameter thereof increases as approaching the light source 21. The light-guiding member 22 includes a surface M4 of incidence, first light-guiding reflecting surface M51 provided on the side of a drive shaft 24, second light-guiding reflecting surface M52 provided on the side situated away from the drive shaft 24, and surface M6 of outgoing. The surface M4 of incidence is arranged facing a light source 21 and provided on a flat surface, which is perpendicular to a center axis C1 of the light source 21.

The second light-guiding reflecting surface M52 is provided on an outer side surface of the light-guiding member 22 and provided on a curved face, an angle θx which a tangent line Lx of the curved face forms with the center axis C1 of the light source 21 becoming larger as the curved face leaves the light source 21 so that the second light-guiding reflecting surface M52 reflects and collects the light L from the light source 21 to the first light-guiding reflecting surface M51.

The first light-guiding reflecting surface M51 is provided on a portion of an inner side surface of the light-guiding member 22, the portion facing the surface M6 of outgoing and the drive shaft 24. The first light-guiding reflecting surface M51 is provided on a curved face, an angle which a tangent line Lx of the curved face forms with the center axis C1 of the light source 21 becoming larger as the curved face leaves the light source 21 so that the first light-guiding reflecting surface M51 reflects the light L from the second light-guiding reflecting surface M52 and converts the light L into approximately parallel light rays Lp. As shown in FIG. 12A, the surface M6 of outgoing is formed in a ring-shape.

The pointer member 20 is formed in one component. The pointer member 20 is provided with a surface M1 of incidence, first reflecting surface M21 for a pointer, third reflecting surface M23 for a pointer, and layer 31 of outgoing. The surface M1 of incidence crosses the drive shaft 24 at right angles. The first reflecting surface M21 for a pointer is provided on the further front side compared to the drive shaft 24.

Figure 13:
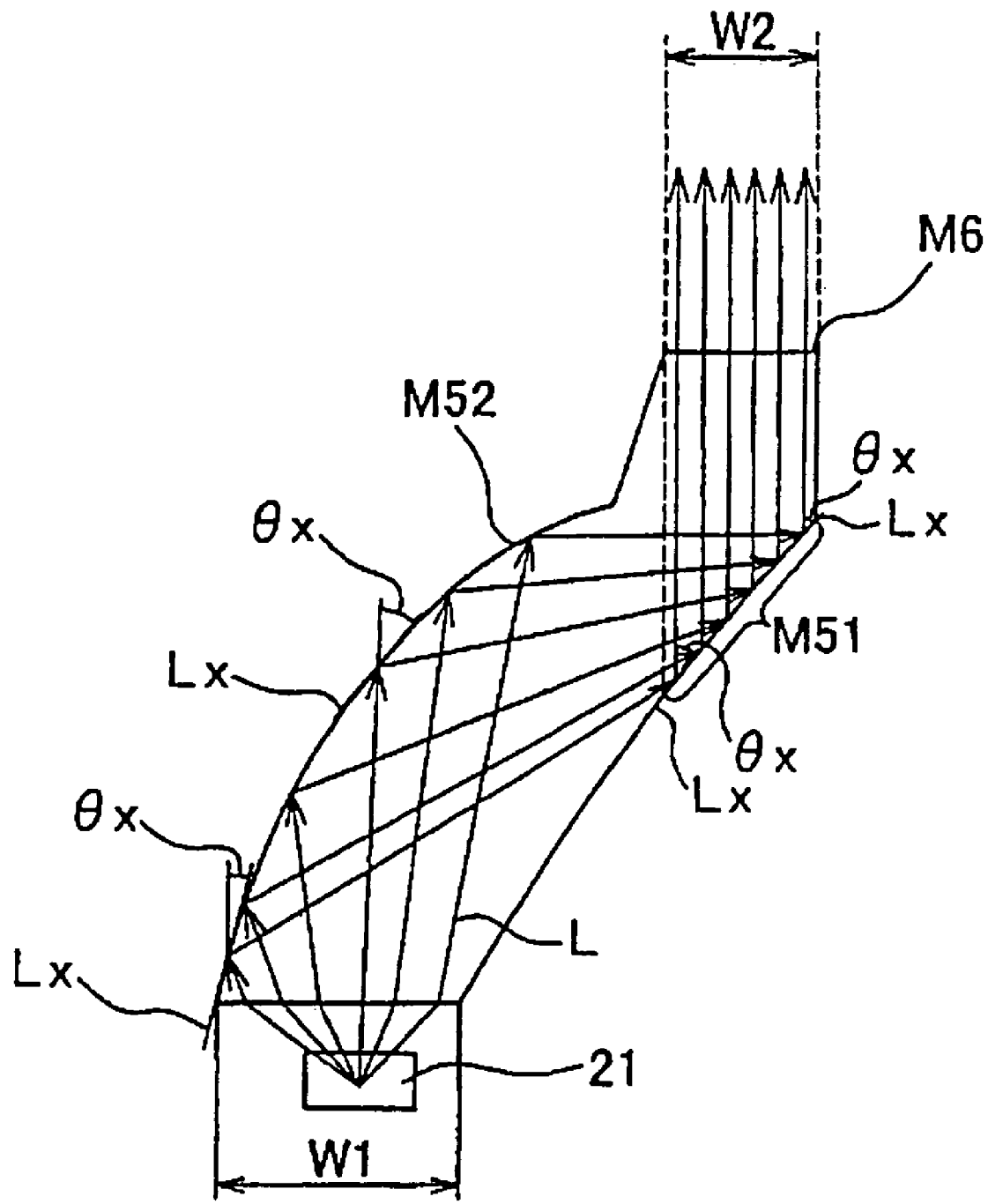
FIG. 13 is a cross sectional view taken along B-B line in FIG. 12B.

In the following, a way how the light L going out from the light source 21 of the pointer illuminator having the construction described above will be explained. As shown in FIGS. 11 and 13, the light L going out radially from the light source 21 enters the light-guiding member 22 from a surface M4 of incidence.

The light L entered the light-guiding member 22 is reflected and collected by the second light-guiding reflecting surface M52 so as to be guided to the first light-guiding reflecting surface M51. The light L guided to the first light-guiding reflecting surface M51 is reflected by the first light-guiding reflecting surface M51 and converted into the approximately parallel light rays Lp, which advance along the drive shaft 24.

Thereafter, the approximately parallel light rays Lp go out in a ring-shape from a surface M6 of outgoing and enters a first reflecting surface M21 for a pointer from a surface M1 of incidence of a pointer member 20. The light L entered the first reflecting surface M21 for a pointer is, reflected by the first reflecting surface M21 for a pointer toward a tip of the pointer (i.e. a front end of the pointer). The light L reflected toward the tip of the pointer is reflected by the third reflecting surface M23 for a pointer toward a layer 31 of outgoing. Then, the light L reflected by the layer 31 of outgoing passes through the third reflecting surface M23 for a pointer and reaches an eye point of a driver of a vehicle, so that the illuminated pointer is seen.

According to the pointer illuminator shown in FIG. 11, since the approximately parallel light rays Lp, which are converted by the first light-guiding reflecting surface M51, are guided to the surface M1 of incidence of the pointer member 20, therefore the approximately parallel light rays Lp enter the first reflecting surface M21 for a pointer, so that almost all the light reflected by the first reflecting surface M21 for a pointer can be guided to the tip of the pointer. Further, since the second reflecting surface M22 for a pointer reflects and collects the light from the light source 21 so as to guide the light to the first light-guiding reflecting surface M51, therefore the light is once collected by the second light-guiding reflecting surface M52 and thereafter, is converted into the approximately parallel light rays Lp by the first light-guiding reflecting surface M51. Accordingly, a size of the surface M6 of outgoing can be controlled depending upon the light collection by the second light-guiding reflecting surface M52. That is, even when a width W1 of the surface M1 of incidence of the light-guiding member 22 is made large in order to make an amount of the light received into the light-guiding member 22 as much as possible, a width W2 of the surface M6 of outgoing can be made small with maintaining high efficiency.

According to the pointer illuminator shown in FIG. 11, since the second light-guiding reflecting surface M52 is at least provided on the center axis C1 of the light source 21, therefore the light exiting on the center axis, from which the strongest light is allowed to emit, can be securely guided to the second light-guiding reflecting surface M52 so as to convert the light into the approximately parallel light rays Lp. Thereby, the light from the light source 21 can be allowed to enter the pointer member 20 further effectively.

In the second preferred embodiment described above, as shown in FIG. 11, the surface M6 of outgoing of the light-guiding member 22 is formed with a flat surface. However, the present invention is not limited to such an embodiment. That is, for example, the surface M6 of outgoing may be formed in a convex or concave lens-shape so as to guide the light form the light source 21 is guided to the pointer member 20 further effectively.

In the second preferred embodiment described above, the first light-guiding reflecting surface M51 and the second light-guiding reflecting surface M52 are provided as respective one surface. However, the present invention is not limited to such an embodiment. That is, for example, as shown in FIG. 14, each of the first light-guiding reflecting surface M51 and the second light-guiding reflecting surface M52 may be divided into two surfaces.

Figure 14:
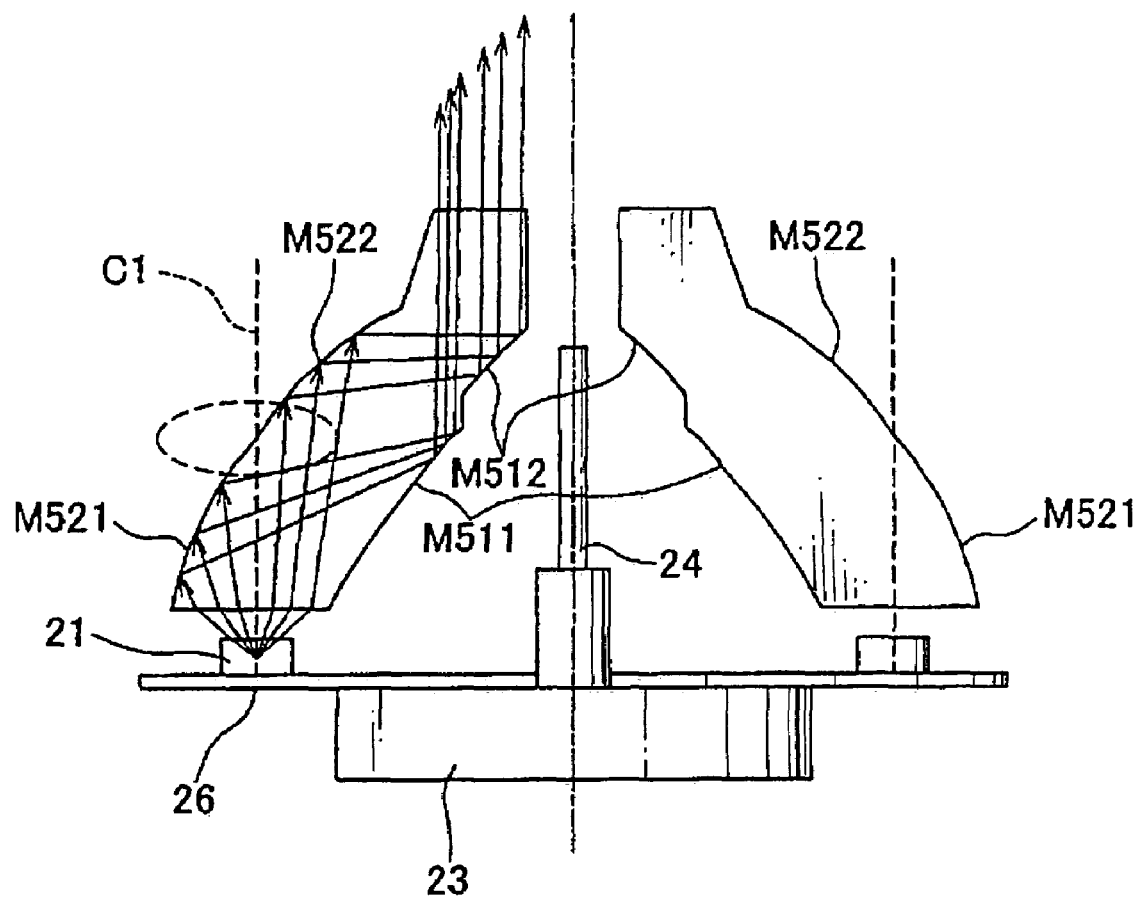
FIG. 14 is a cross sectional view illustrating a light-guiding member according to another preferred embodiment of the present invention.

That is, as shown in FIG. 14, the light-guiding member 22 is provided with: a second light-guiding reflecting surface M521 situated further away from the drive shaft 24 compared to the center axis C1 of the light source 21; and a second light-guiding reflecting surface M522 situated on the side of the drive shaft 24. In addition, the light-guiding member 22 is provided with a first light-guiding reflecting surface M511 and a first light-guiding reflecting surface M512.

Each of the second light-guiding reflecting surfaces M521 and M522 is provided in such a manner that an angle which said each forms with the center axis of the light source 21 becomes large as said each leaves the light source 21 so that said each reflects and collects the light L1 from the light source 21 so as to guide the light L1 to the first light-guiding reflecting surfaces M511 and M512, respectively. Each of the first light-guiding reflecting surfaces M511 and M512 is provided in such a manner that an angle which said each forms with the center axis of the light source 21 becomes large as said each leaves the light source 21 so that said each converts the light L1 guided from the second light-guiding reflecting surfaces M521 and M522 into the approximately parallel light rays Lp, respectively.

As for the light rays entered from the light source 21, directional property of the rays is reversed at the center axis C1 as a boundary, therefore the most appropriate shape can be attained fitted to each light having a corresponding directional property by dividing the first light-guiding reflecting surface M51 and the second light-guiding reflecting surface M52. Thereby, higher parallelism of outgoing can be attained. In the example shown in FIG. 14, dividing into two pieces is adopted. However, the present invention is not limited to such an embodiment. That is, for example, dividing into three or four pieces may be adopted. In the example shown in FIG. 14, each of the first light-guiding reflecting surface M51 and the second light-guiding reflecting surface M52 is constructed with a plurality of curved surfaces. However, the present invention is not limited to such an embodiment. That is, for example, each of the first light-guiding reflecting surface M51 and the second light-guiding reflecting surface M52 may be constructed with a plurality of flat surfaces.

In the second preferred embodiment described above, the light L reflected by the first light-guiding reflecting surface M51 directly goes out from the surface M6 of outgoing without being reflected further afterward. However, the present invention is not limited to such an embodiment. That is, for example, similarly to the first preferred embodiment shown in FIG. 1, the light-guiding member 22 may be provided with the third light-guiding reflecting surface M53 so as to reflect the approximately parallel light rays Lp toward the drive shaft 24 followed by outgoing thereof. In this case, the pointer member 20 may also be provided as shown in FIGS. 1 and 5.

In the first and second preferred embodiments described above, the first light-guiding reflecting surface M51 is provided so as to reflect the radial light L going out from the light source 21 and convert the light L into the approximately parallel light rays Lp. In the following, the approximately parallel light rays Lp will be explained.

Figure 15:
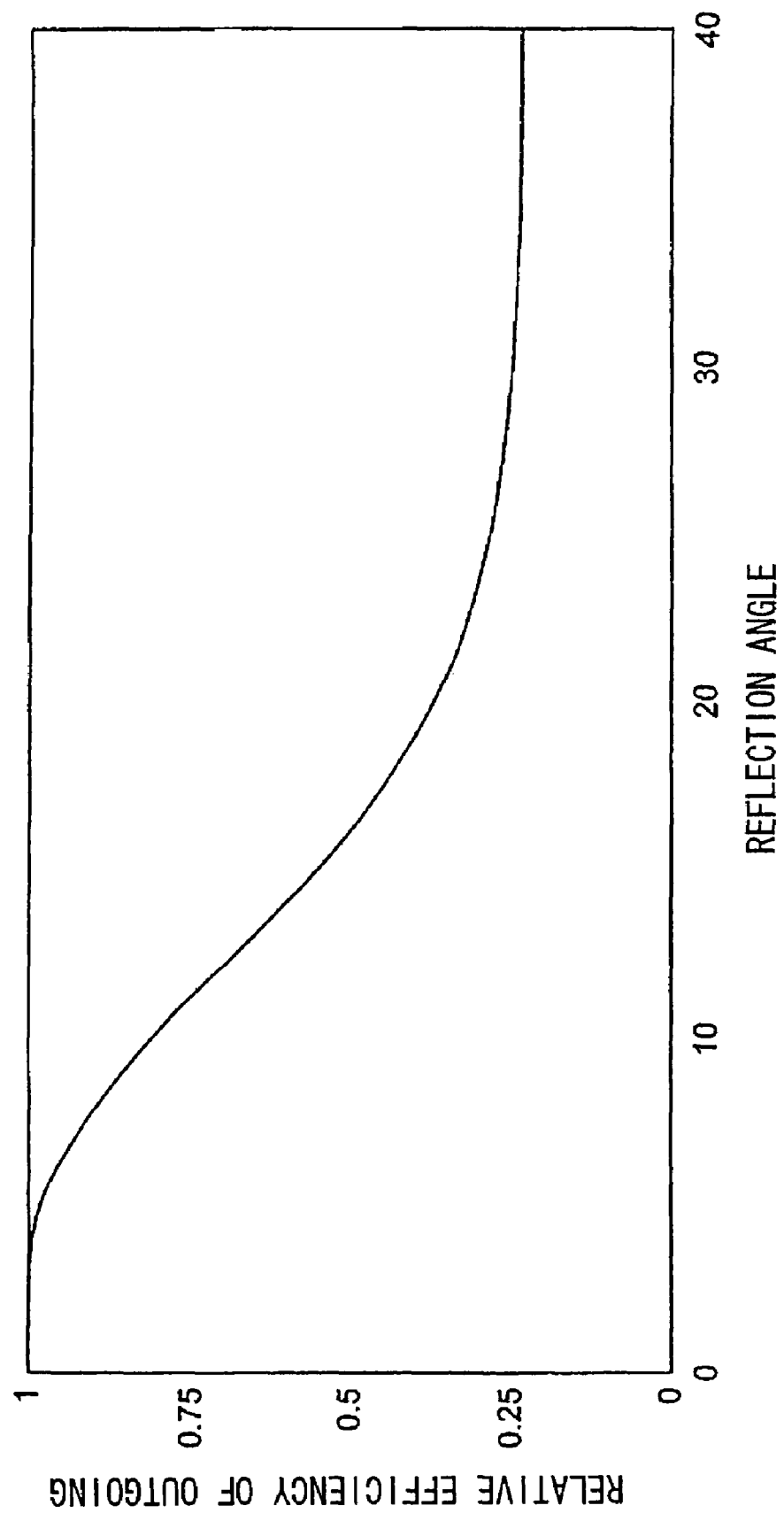
FIG. 15 is a graph illustrating a relation between a reflection angle at the first light-guiding reflecting surface and a relative efficiency of outgoing.
Figure 16:
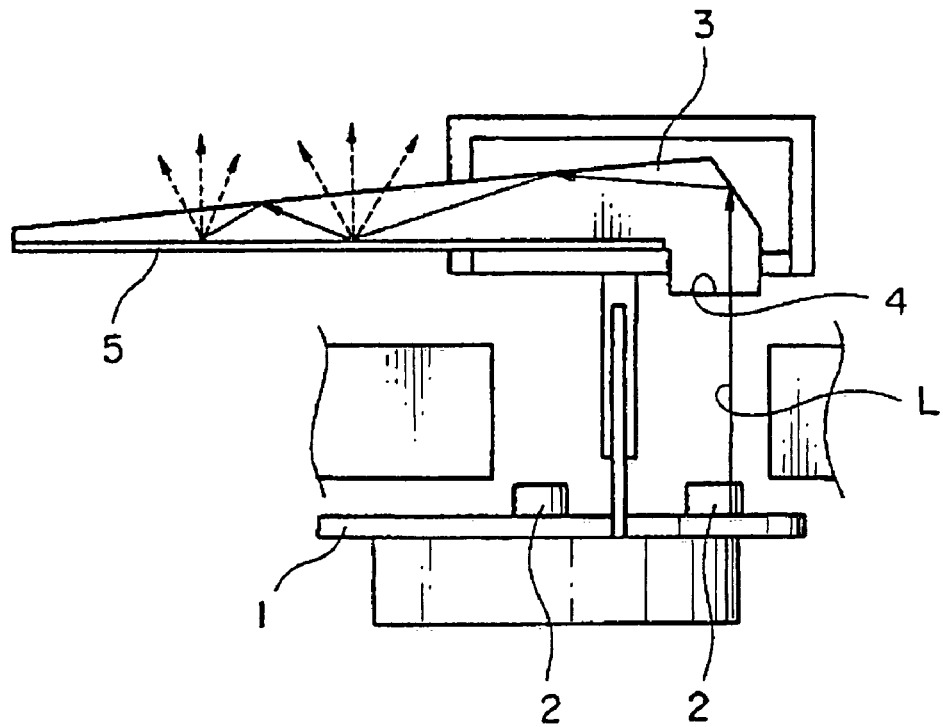
FIG. 16 is a schematic view illustrating an example of a conventional pointer illuminator.
Figure 17:
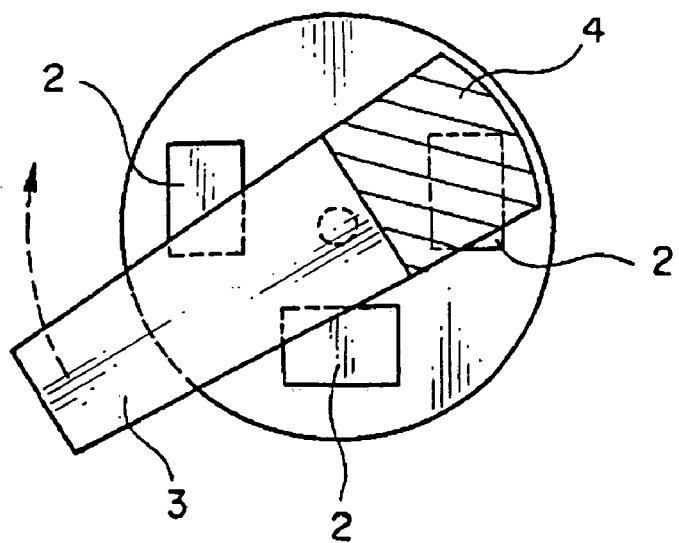
FIG. 17 is a schematic front view of the conventional pointer illuminator shown in FIG. 16.
Figure 18:
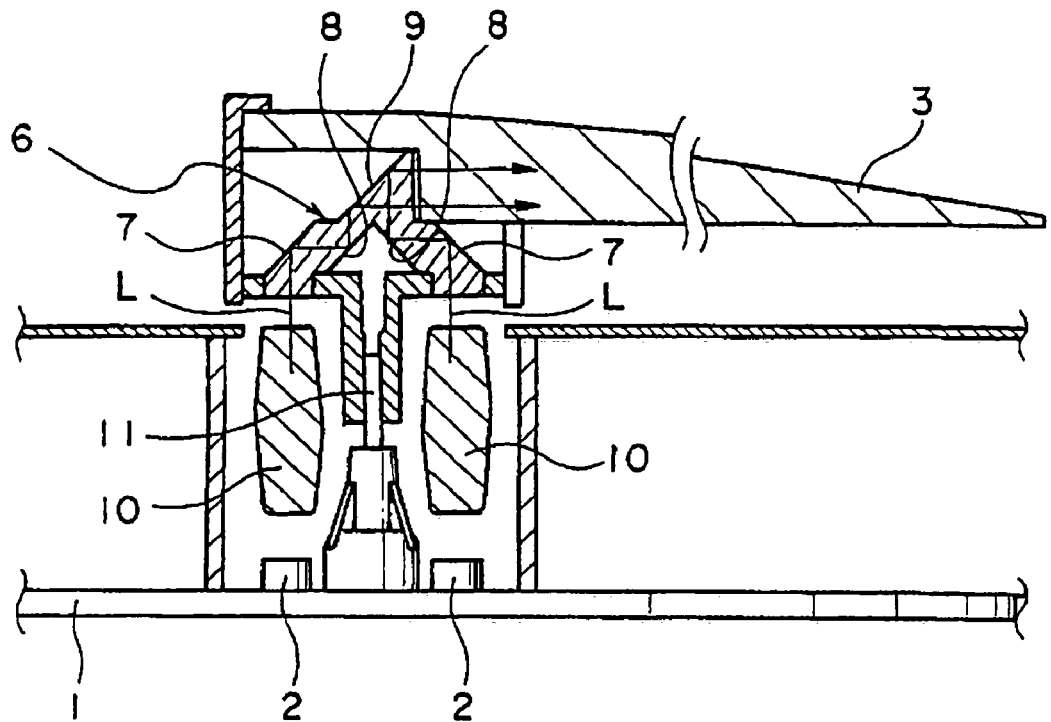
FIG. 18 is a schematic view illustrating another example of a conventional pointer illuminator.
Figure 19:
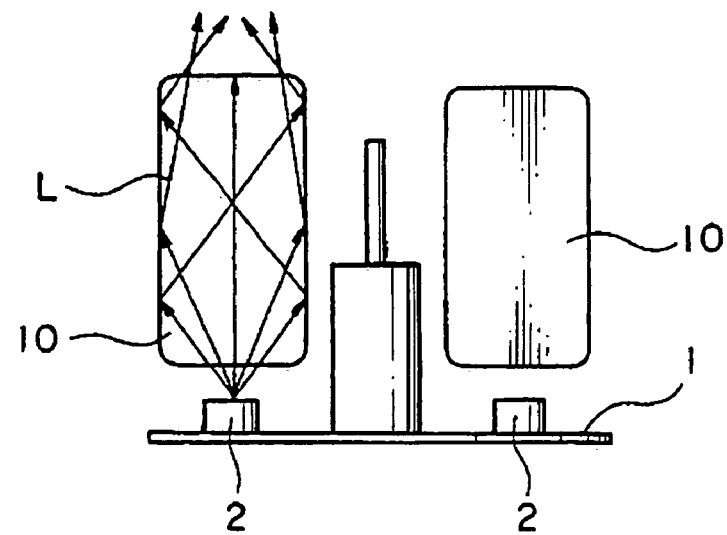
FIG. 19 is a partial enlarged view of the conventional pointer illuminator shown in FIG. 18.

As for the pointer illuminator described above, a relative efficiency of outgoing was measured when a reflection angle at the first light-guiding reflecting surface M51 was varied in a range of from 0 degree to ±40 degrees. The results are shown in FIG. 15. Here, the reflection angle is defined as an angle formed between the light reflected by the first light-guiding reflecting surface M51 and the center axis C1 of the light source 21. The efficiency of outgoing is defined as a ratio of an amount of the light entering the pointer member 20 to an amount of the light emitted from the light source 21. The relative efficiency of outgoing is defined as an efficiency of outgoing when the reflection angle is varied in the range of from 0 degree to ±40 degrees supposing that the efficiency of outgoing is 1 when the reflection angle at the first light-guiding reflecting surface M51 is 0 degree.

As shown in FIG. 15, a high relative efficiency of outgoing equal to or higher than 80% was obtained for the reflection angle in the range of from 0 degree to 10 degrees. When the reflection angle exceeded 10 degrees, the relative efficiency of outgoing was deteriorated. Therefore, it was found that the first light-guiding reflecting surface M51 might be provided in such a manner that the dispersion of the approximately parallel light rays Lp lies within a range of from 0 degree to 10 degrees.

In the first and second preferred embodiments described above, three light sources 21 are provided. However, the present invention is not limited to such an embodiment. That is, for example, two light sources 21 may be provided or, alternatively, more than three light sources 21 may be provided.

The aforementioned preferred embodiments are described to aid in understanding the present invention and variations may be made by one skilled in the art without departing from the spirit and scope of the present invention.

What is claimed is:

1. A pointer illuminator comprising:
   an optically transparent pointer member having a reflecting surface for a pointer, which surface reflects light incident on a predetermined surface of incidence of the pointer member and guides the light to a tip of the pointer;
   a light source arranged around a drive shaft of the pointer member; and
   an optically transparent light-guiding member, which guides light from the light source to the surface of incidence of the pointer member and includes a first light-guiding reflecting surface formed in a paraboloid shape provided on a face of the light-guiding member, an angle between the first light-guiding reflecting surface and a center axis of the light source becoming smaller as the first light-guiding reflecting surface leaves the light source so that the first light-guiding reflecting surface reflects the light from the light source to convert the light into approximately parallel light rays, whereby the light-guiding member guides the parallel light rays to the surface of incidence of the pointer member.

2. The pointer illuminator according to claim 1, wherein a surface of incidence of the light-guiding member facing the light source is provided on a concave face of the light-guiding member, a part of the concave face existing on the center axis of the light source denting most in a direction leaving the light source.

3. The pointer illuminator according to claim 1, wherein the first light-guiding reflecting surface is provided on a paraboloid having the light source as a focal point.

4. The pointer illuminator according to claim 1, wherein the light source is arranged in such a manner that a center axis of the light source is parallel to the drive shaft of the pointer member, wherein the light-guiding member includes a second light-guiding reflecting surface, which reflects the parallel light rays parallel to the drive shaft converted by the first light-guiding reflecting surface toward the drive shaft so as to guide the parallel light rays to the surface of incidence of the pointer member.

5. The pointer illuminator according to claim 1, wherein the reflecting surface for a pointer of the pointer member includes: a first reflecting surface for a pointer provided on a front side of a rear end of the pointer and reflecting incident light toward a tip of the pointer; and a second reflecting surface for a pointer provided at a dent where a bearing part of the drive shaft is projectingly formed, said second reflecting surface reflecting light entered from the surface of incidence of the pointer member to the first reflecting surface for a pointer.

6. The pointer illuminator according to claim 5, wherein the first reflecting surface for a pointer is provided on a side of the rear end of the pointer, wherein a top of the dent is provided on the side of the further rear end of the pointer compared to the bearing part, said top being situated at the front side.

7. The pointer illuminator according to claim 5, wherein the first reflecting surface for a pointer is provided on a side of the rear end of the pointer,
wherein the pointer member includes a pointer body part having the first reflecting surface for a pointer and a light-introducing part having the surface of incidence of the pointer member and the second reflecting surface for a pointer,
wherein the light-introducing part includes a refracting surface which refracts light reflected by the second reflecting surface for a pointer toward the first reflecting surface for a pointer.

8. The pointer illuminator according to claim 1, wherein the pointer member includes a pointer body part and a light-introducing part having the surface of incidence of the pointer member,
wherein the reflecting surface for a pointer of the pointer member includes: a first reflecting surface for a pointer, which is provided on the side of a rear end of the pointer of the pointer body part and reflects incident light toward a tip of the pointer; and a second reflecting surface for a pointer, which is provided in the light-introducing part and reflects incident light from the surface of incidence of the pointer member to the first reflecting surface for a pointer,
wherein the light-introducing part includes a refracting surface which refracts light reflected by the second reflecting surface for a pointer toward the first reflecting surface for a pointer.

9. A pointer illuminator comprising:
an optically transparent pointer member having a reflecting surface for a pointer, which surface reflects light incident on a predetermined surface of incidence of the pointer member and guides the light to a tip of the pointer;
a light source arranged around a drive shaft of the pointer member; and
an optically transparent light-guiding member, which guides light from the light source to the surface of incidence of the pointer member and includes a first light-guiding reflecting surface provided on a side of the drive shaft and a second light-guiding reflecting surface provided on a side situated away from the drive shaft, whereby the light-guiding member guides light reflected by the first and second light-guiding reflecting surfaces to the surface of incidence of the pointer member,
wherein the second light-guiding reflecting surface is provided on a first face of the light-guiding member, an angle between the second light-guiding reflecting surface and a center axis of the light source becoming larger as the second light-guiding reflecting surface leaves the light source so that the second light-guiding reflecting surface reflects and collects the light from the light source to the first light-guiding reflecting surface,
wherein the first light-guiding reflecting surface is provided on a second face of the light-guiding member, an angle between the first light-guiding reflecting surface and the center axis of the light source becoming larger as the first light-guiding reflecting surface leaves the light source so that the first light-guiding reflecting surface reflects the light from the second light-guiding reflecting surface to convert the light into approximately parallel light rays.

10. The pointer illuminator according to claim 9, wherein the second light-guiding reflecting surface is provided at least on the center axis of the light source.

11. The pointer illuminator according to claim 9, wherein the light source is arranged in such a manner that a center axis of the light source is parallel to the drive shaft of the pointer member, wherein the light-guiding member includes a third light-guiding reflecting surface, which reflects the parallel light rays parallel to the drive shaft converted by the first light-guiding reflecting surface toward the drive shaft so as to guide the parallel light rays to the surface of incidence of the pointer member.

12. The pointer illuminator according to claim 9, wherein the reflecting surface for a pointer of the pointer member includes: a first reflecting surface for a pointer provided on a front side of a rear end of the pointer and reflecting incident light toward a tip of the pointer; and a second reflecting surface for a pointer provided at a dent where a bearing part of the drive shaft is projectingly formed and reflecting light entered from the surface of incidence of the pointer member to the first reflecting surface for a pointer.

13. The pointer illuminator according to claim 12, wherein the first reflecting surface for a pointer is provided on the side of the further rear end of the pointer compared to the drive shaft, wherein a top of the dent is provided on the side of the further rear end of the pointer compared to the bearing part, said top being situated at the extremely front side.

14. The pointer illuminator according to claim 12, wherein the first reflecting surface for a pointer is provided on the side of the further rear end of the pointer compared to the drive shaft,
wherein the pointer member includes a pointer body part having the first reflecting surface for a pointer and a light-introducing part having the surface of incidence of the pointer member and the second reflecting surface for a pointer,
wherein the light-introducing part includes a refracting surface which refracts light reflected by the second reflecting surface for a pointer toward the first reflecting surface for a pointer.

15. The pointer illuminator according to claim 9, wherein the pointer member includes a pointer body part and a light-introducing part having the surface of incidence of the pointer member,
wherein the reflecting surface for a pointer of the pointer member includes: a first reflecting surface for a pointer, which is provided on the side of a further rear end of the pointer compared to the drive shaft of the pointer body part and reflects incident light toward a tip of the pointer; and a second reflecting surface for a pointer, which is provided in the light-introducing part and reflects incident light from the surface of incidence of the pointer member to the drive shaft,
wherein the light-introducing part includes a refracting surface which refracts light reflected by the second reflecting surface for a pointer toward the first reflecting surface for a pointer.

* * * * *